United States Patent
Park et al.

(10) Patent No.: US 7,996,489 B2
(45) Date of Patent: Aug. 9, 2011

(54) METHOD AND APPARATUS FOR ALLOWING A PORTABLE DEVICE TO PROVIDE RICH SITE SUMMARY SERVICE

(75) Inventors: Hyun-mi Park, Suwon-si (KR); Young-kyu Jin, Seoul (KR); Hyun-joo Kang, Suwon-si (KR); Sin-ae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 12/249,229

(22) Filed: Oct. 10, 2008

(65) Prior Publication Data

US 2009/0187638 A1 Jul. 23, 2009

(30) Foreign Application Priority Data

Jan. 17, 2008 (KR) .................. 10-2008-0005337

(51) Int. Cl.
  *G06F 15/16* (2006.01)
  *G06F 17/00* (2006.01)
(52) U.S. Cl. ........ 709/217; 709/218; 709/219; 715/200; 715/206; 715/234; 715/864
(58) Field of Classification Search .................. 709/217, 709/218, 219; 715/200, 206, 234, 864
See application file for complete search history.

(56) References Cited

U.S. PATENT DOCUMENTS

| | | | | |
|---|---|---|---|---|
| 7,409,393 B2 * | 8/2008 | Gregoire et al. ........................ 1/1 |
| 7,730,107 B1 * | 6/2010 | Shultz et al. .................. 707/802 |
| 2007/0094389 A1 * | 4/2007 | Nussey et al. ................. 709/225 |
| 2007/0094391 A1 * | 4/2007 | Nussey ......................... 709/225 |
| 2007/0156809 A1 * | 7/2007 | Dickinson et al. ............ 709/203 |
| 2007/0168367 A1 * | 7/2007 | Dickinson et al. ............ 707/100 |
| 2007/0234211 A1 * | 10/2007 | Henderson ..................... 715/700 |
| 2007/0294646 A1 * | 12/2007 | Timmons ....................... 715/864 |
| 2008/0140720 A1 * | 6/2008 | Six et al. .................... 707/104.1 |
| 2008/0155118 A1 * | 6/2008 | Glaser et al. .................. 709/238 |
| 2008/0172370 A1 * | 7/2008 | Farouki ............................. 707/5 |
| 2008/0196022 A1 * | 8/2008 | Diederichs .................... 717/173 |
| 2008/0201449 A1 * | 8/2008 | Huang et al. .................. 709/218 |
| 2008/0256213 A1 * | 10/2008 | Carrier et al. ................. 709/207 |
| 2008/0294647 A1 * | 11/2008 | Ramaswamy .................. 707/10 |
| 2009/0005087 A1 * | 1/2009 | Lunati et al. .................. 455/466 |
| 2009/0037533 A1 * | 2/2009 | Gilfix et al. ................... 709/205 |
| 2009/0106768 A1 * | 4/2009 | Ramanathan et al. ........ 719/311 |
| 2009/0187577 A1 * | 7/2009 | Reznik et al. ................... 707/10 |
| 2009/0228973 A1 * | 9/2009 | Kumar et al. ................... 726/15 |
| 2009/0254635 A1 * | 10/2009 | Lunt ............................. 709/219 |
| 2010/0131455 A1 * | 5/2010 | Logan et al. .................. 707/602 |

* cited by examiner

*Primary Examiner* — Krisna Lim

(74) *Attorney, Agent, or Firm* — Sughrue Mion, PLLC

(57) ABSTRACT

A method of allowing a portable device to provide a rich site summary (RSS) feed including information about renewal of contents, and an apparatus performing the method are provided. If contents of the portable device are renewed, the portable device generates an RSS feed for the renewed contents and sends the RSS feed to an RSS reader, and accordingly, a related art web-based RSS service is expanded to the portable device. Therefore, even if the user does not browse all contents of the portable device, a user of the portable device can easily see only information about contents that are recently updated using another device such as a personal computer (PC).

9 Claims, 6 Drawing Sheets

FIG. 1A (RELATED ART)

```
<?xml version="1.0" encoding="EUC-KR" ?>
<!-- generator="CNET Korea. Inc, Wed, 19 Sep 2007 11:32:07 +0900" -->
- <rss version="2.0">
  - <channel>
      <title>ZDNet Korea | All News</title>
      <description>All News from ZDNet Korea.</description>
      <link>http://www.zdnet.co.kr</link>
      <lastBuildData>Wed, 19 Sep 2007 11:32:07 +0900</lastBuildData>
      <generator>CNET Korea.Inc, Wed, 19 Sep 2007 11:32:07 +9000</generator>
    - <image>
        <url>http://www.zdnet.co.kr/images/etc/zdnet-logo_150x53.jpg</url>
        <title>ZDNet Korea | All News</title>
        <link>http://www.zdnet.co.kr</link>
        <description>Feed provied by CNET Korea.Inc</description>
      </image>
    - <item>
        <title> Village People who sang 「YMCA」 sued You Tube</title>

<link>http://www.zdnet.co.kr/news/internet/entertainment/1308.htm</link>
        <description>somebody posted a movie, that Adolf Hitler is dancing to the
          song 'YMCA'that is a hit song of Village People, on You Tube.</description>
        <author>Greg Sandoval</author>
        <pubData>Wed, 19 Sep 2007 11:31:20 +0900</pubData>
      </item>
```

FIG. 4A

```
<?xml version="1.0" encoding="EUC-KR" ?>
<!-- generator="Samsung. Inc, Wed, 19 Sep 2007 12:21:23 +0900" -->
- <drss version="2.0">
  - <device>
      <model>VLUU NV20</model>
      <description>Samsung Tecwin, released 2007, 09</description>
      <ipaddress>101.222.333.222</ipaddress>
      <lastAddData>Wed, 19 Sep 2007 12:21:23 +0900</lastAddData>
    - <item>
        <contentType>Photo</contentType>
        <file>VImage2345.jpg</file>
        <resolution>640x480</resolution>
        <description/>
        <GPS>meridian 00, latitudes 00</GPS>
        <pubData>Wed, 19 Sep 2007 12:21:23 +0900</pubData>
      <item>
    - <item>
        <contentType>Video</contentType>
        <file>VVideo2333.mpg</file>
        <resolution>320x240</resolution>
        <description/>
        <GPS>meridian 00, latitudes 00</GPS>
        <pubData>Wed, 19 Sep 2007 11:57:20 +0900</pubData>
      </item>
```

METHOD AND APPARATUS FOR ALLOWING A PORTABLE DEVICE TO PROVIDE RICH SITE SUMMARY SERVICE

CROSS-REFERENCE TO RELATED PATENT APPLICATION

This application claims priority from Korean Patent Application No. 10-2008-0005337, filed on Jan. 17, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to allowing a portable device to communicate with other devices, and more particularly, to allowing a portable device to renew contents, and then to effectively inform another device about information on the contents.

2. Description of the Related Art

According to the related art, when surfing the web, a user can bookmark a web page that he/she finds to be of interest, in order to quickly access the web page later.

However, according to the above related art method, the user does not know whether the website has been updated or new data have been uploaded unless the user visits the website again by clicking on the bookmark.

To address this problem, a rich site summary (RSS) service has been suggested. The RSS service is a program for transmitting information to users who subscribed to a website to receive in advance information about updated content on the website, even if the user does not visit the website. In this service, a server managing the website generates an RSS feed, i.e., a document including summary information about newly uploaded data, when the newly uploaded data are published on the website, and sends the RSS feed to an RSS reader (also, referred to an RSS aggregator) program that RSS-users subscribed to the website in advance. Accordingly, the user installs the RSS reader program on his/her personal computer (PC) and subscribes to the website by registering an RSS address of the website in the RSS reader, so that the user can easily obtain new information of the website.

FIG. 1A shows an XML document corresponding to an RSS feed, and FIG. 1B shows the configuration of tags used with respect to one piece of uploaded data in an RSS feed.

Referring to FIG. 1A, the RSS feed is a document made in an extensible markup language (XML). Information of a channel to which an RSS service is provided, that is, information of a website, is represented using channel elements such as <title>, <link>, <description>, <image>, etc., in a <channel> tag.

On the other hand, information about newly uploaded data is represented using <title>, <link>, <description>, etc., in an <item> tag; the elements of the <item> tag are shown in FIG. 1B. The details of the RSS feed are described in an RSS standard, and thus will be omitted herein.

As such, when an RSS reader is used, an Internet user can obtain updated information regarding a website without visiting the website. An RSS server providing an RSS feed is only used to obtain information such as blogs, news, or the like from the web. However, the RSS server is not used in relation to portable devices such as digital cameras, digital camcorders, or the like, which generate or renew their own contents not by uploading data.

That is, since contents are updated frequently in portable devices which generate their own contents, the user must reproduce all contents one by one in order to find the updated contents. Also, in the related art, a user can not obtain updated information about the contents of the portable device using an apparatus such as a PC having more user-friendly interface than the portable device.

SUMMARY OF THE INVENTION

The present invention provides a method of allowing a portable device to provide a rich site summary (RSS) feed including information about renewal of contents, and an apparatus using the method.

According to an aspect of the present invention, there is provided a method of allowing a portable device to communicate with other devices, the method including: if contents of the portable device are renewed, generating an RSS feed for the renewed contents; and sending the RSS feed to an RSS reader of the portable device.

The RSS feed may include at least one of information about a model name, an IP address, a maker of the portable device, and metadata of the contents that are generated by the renewal.

The method may further include certifying whether the RSS reader has authority to receive an RSS feed of the portable device, wherein in the sending of the RSS feed, the RSS feed is sent to the RSS reader only when the certifying succeeded.

Here, the contents may include at least one of an image file, a movie file, and an audio file.

According to another aspect of the present invention, there is provided a computer readable recording medium having embodied thereon a computer program for executing the method.

According to another aspect of the present invention, there is provided a portable device, including: an RSS feed generating unit generating an RSS feed for renewed contents; and a communication unit sending the RSS feed to an RSS reader of the portable device.

The RSS feed may include at least one of information about a model name, an IP address, a maker of the portable device, and metadata of the contents that are generated by the renewal.

The portable device may further include a certification unit for certifying whether the RSS reader has authority to receive an RSS feed of the portable device or not, wherein the communication unit sends the RSS feed to the RSS reader only when the certifying succeeded.

Here, the contents may include at least one of an image, a movie, and a sound.

BRIEF DESCRIPTION OF THE DRAWINGS

The above and other features of the present invention will become more apparent by describing in detail exemplary embodiments thereof with reference to the attached drawings in which:

FIG. 1A shows an XML document corresponding to a rich site summary (RSS) feed;

FIG. 4A shows an RSS feed generated by a portable device according to an exemplary embodiment of the present invention.

DETAILED DESCRIPTION OF EXEMPLARY
EMBODIMENTS OF THE INVENTION

Exemplary embodiments according to the present invention will be described in detail with reference to the accompanying drawings.

Figure 2:
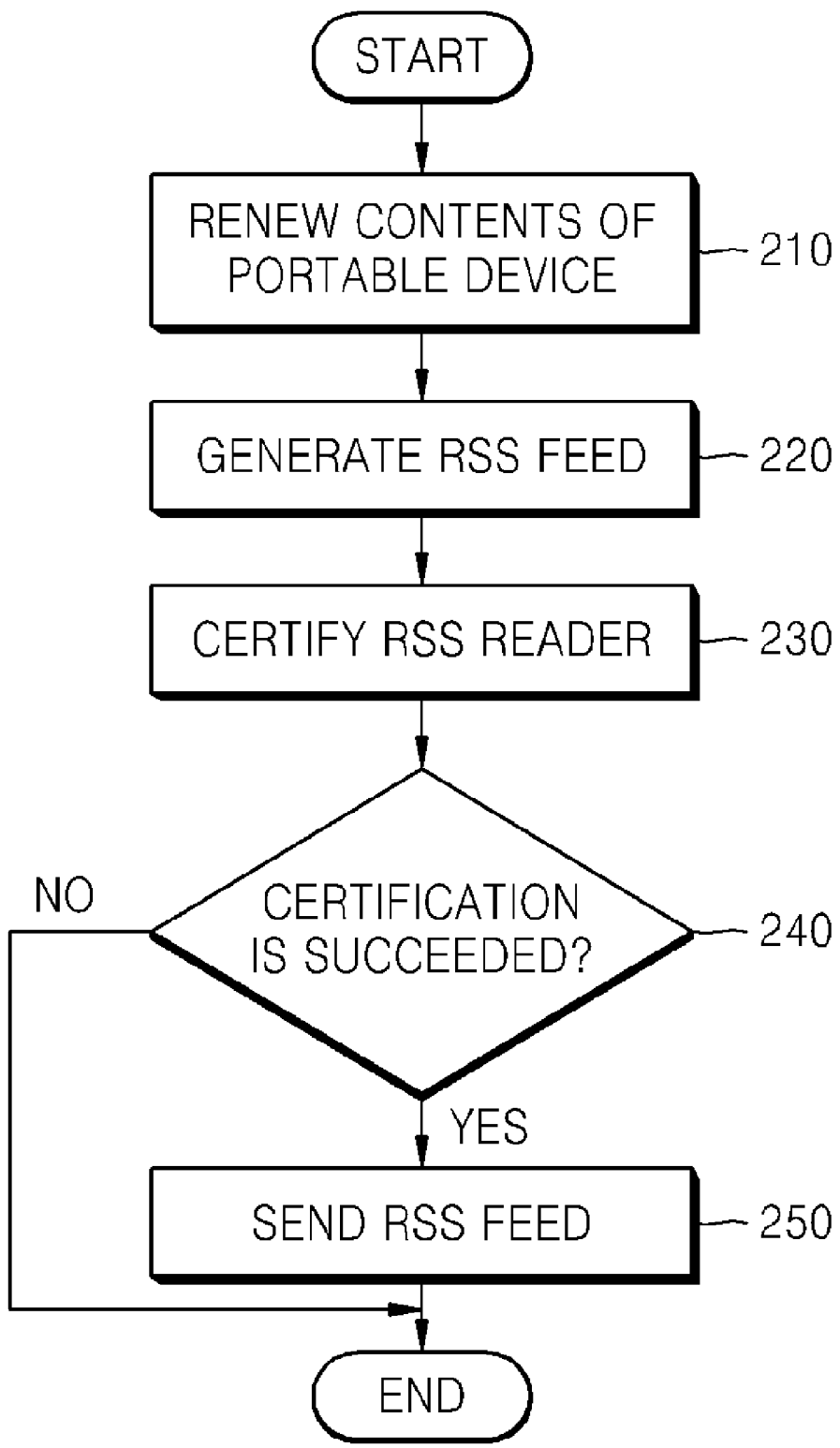
FIG. 2 is a flowchart of a method of communicating between a portable device and an RSS reader according to an exemplary embodiment of the present invention.

FIG. 2 is a flowchart of a method of communicating between a portable device and an RSS reader according to an exemplary embodiment of the present invention.

In step 210, digital contents of the portable device are renewed. Here, the digital contents include at least one of an image file, a movie file, and an audio file. Contents that are newly added may be a photo image that is newly taken by a digital camera, or may be a movie shot with a camcorder. Also, the contents may be contents copied from the outside to a memory of the portable device.

In step 220, the portable device generates a rich site summary (RSS) feed with respect to the renewed contents. The portable device according to an exemplary embodiment of the present invention generates the RSS feed and sends the RSS feed to an RSS reader. Thus, the portable device has a networking function.

The RSS feed generated by the portable device according to an exemplary embodiment of the present invention may include information about a model name, an IP address, the maker of the portable device, metadata of the contents generated by the renewal, and the like. The information are not included in a related art web-based RSS feed.

The RSS feed used in the related art web-based RSS service relates to uploaded data. On the other hand, the RSS feed used in an exemplary embodiment of the present invention relates to contents of the portable device, and thus does not have the format of the related art RSS feed. Hereinafter, the RSS feed generated by the portable device according to an exemplary embodiment of the present invention will be referred to as a device RSS feed.

In step 230, the portable device certifies an RSS reader that requests the device RSS feed. In general, the portable device belongs to an individual, and contents, such as a photo or a movie generated by the portable device are private items. Accordingly, the contents stored in the portable device must be protected so as not to be unrestrictedly distributed.

However, in general, in an RSS service on the web, when an RSS address is registered in an RSS reader, a server distributing the RSS feed sends an RSS feed to every RSS reader which requests the RSS feed. Thus, such related art method must be modified to be used with the device RSS service according to an exemplary embodiment of the present invention.

Accordingly, the portable device according to an exemplary embodiment of the present invention certifies whether an RSS reader has authority to see contents of the portable device, before the portable device sends a device RSS feed. In a certifying process of step 230, various methods (for example, registering in advance an IP address of a device in which the RSS reader is installed in the portable device, or using a user's password in the portable device) may be used, and accordingly, the certification method is not limited to a specified method in an exemplary embodiment of the present invention.

In step 240, the portable device determines whether the certification succeeded or failed. If the certification failed, the portable device stops communicating with the RSS reader.

In step 250, if the certification succeeded, the portable device sends the device RSS feed to the RSS reader.

Figure 3:
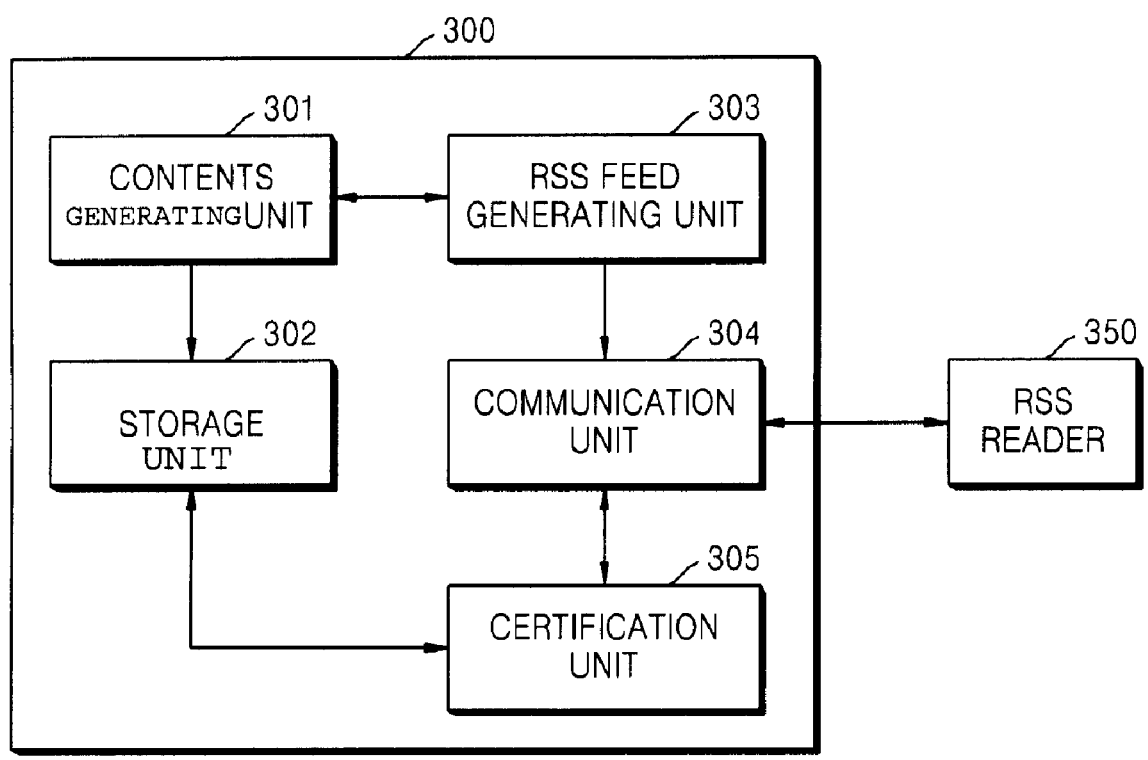
FIG. 3 is a block diagram illustrating the configuration of a portable device according to an exemplary embodiment of the present invention.

FIG. 3 is a block diagram illustrating the configuration of a portable device according to an exemplary embodiment of the present invention.

A portable device 300 according to an exemplary embodiment of the present invention includes a contents generating unit 301, a storage unit 302, an RSS feed generating unit 303, a communication unit 304, and a certification unit 305.

The contents generating unit 301 generates new contents or receives new contents from the outside, and stores the new contents in the storage unit 302.

The RSS feed generating unit 303 generates a device RSS feed by using information about contents which are renewed by the contents generating unit 301.

The communication unit 304 is used to communicate with an RSS reader 350 and sends the device RSS feed generated by the RSS feed generating unit 303 to the RSS reader 350, however, it does not send the device RSS feed to an RSS reader whose certification is not successful.

The certification unit 305 verifies whether the RSS reader 350, which has requested the device RSS feed, has authority to see the contents stored in the storage unit 302 of the portable device 300. As described above, the certification method is not limited to a specified method. However, in general, the certification unit 305 performs certification by receiving certification information from the RSS reader 350, and comparing the received certification information with certification information stored in the storage unit 302 in advance.

FIG. 4A shows an RSS feed generated by a portable device according to an exemplary embodiment of the present invention.

Referring to FIG. 4A, a device RSS feed according to the current exemplary embodiment is generated by a portable device 'VLUU NV20' manufactured by Samsung Techwin Co., Ltd., and an IP address of the portable device is 101.222.333.222. The information are represented by tag values such as <model>, <description>, <ipaddress>, etc.

An image file 'VIimage2345.jpg' and a movie file 'VVideo2333.mpg' are added to the VLUU NV20, and also, information about the generation date, resolution, etc., of each of the files are added to the VLUU NV20.

Figure 4B:
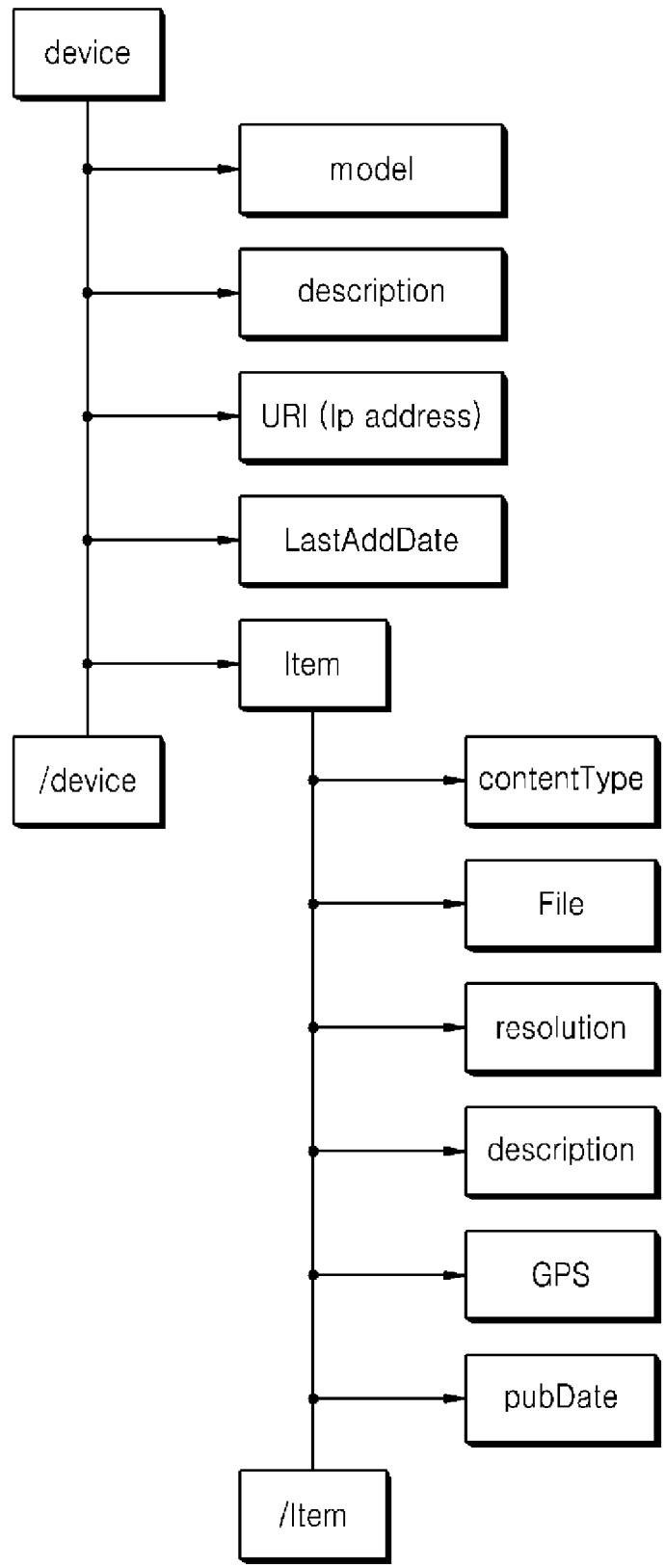
FIG. 4B shows tags of an RSS feed generated by a portable device according to an exemplary embodiment of the present invention.

FIG. 4B shows tags of an RSS feed generated by a portable device according to an exemplary embodiment of the present invention.

Referring to FIG. 4B, a related art web-based RSS feed includes a <channel> tag, however, a device RSS feed according to an exemplary embodiment of the present invention includes a <device> tag instead of the <channel> tag. Elements of the <device> tag may include <model>, <description>, <URI>, <LastAddDate>, etc., and the elements represent information about the portable device. Also, it is obvious to one of ordinary skill in the art that other elements capable of representing information about the portable device, as well as the <device> elements illustrated in FIGS. 4A and 4B, can be included in the RSS feed.

On the other hand, elements of an <item> tag including information about each content in a device RSS feed are different from elements representing information of uploaded data in a related art web-based RSS feed.

Figure 1B:
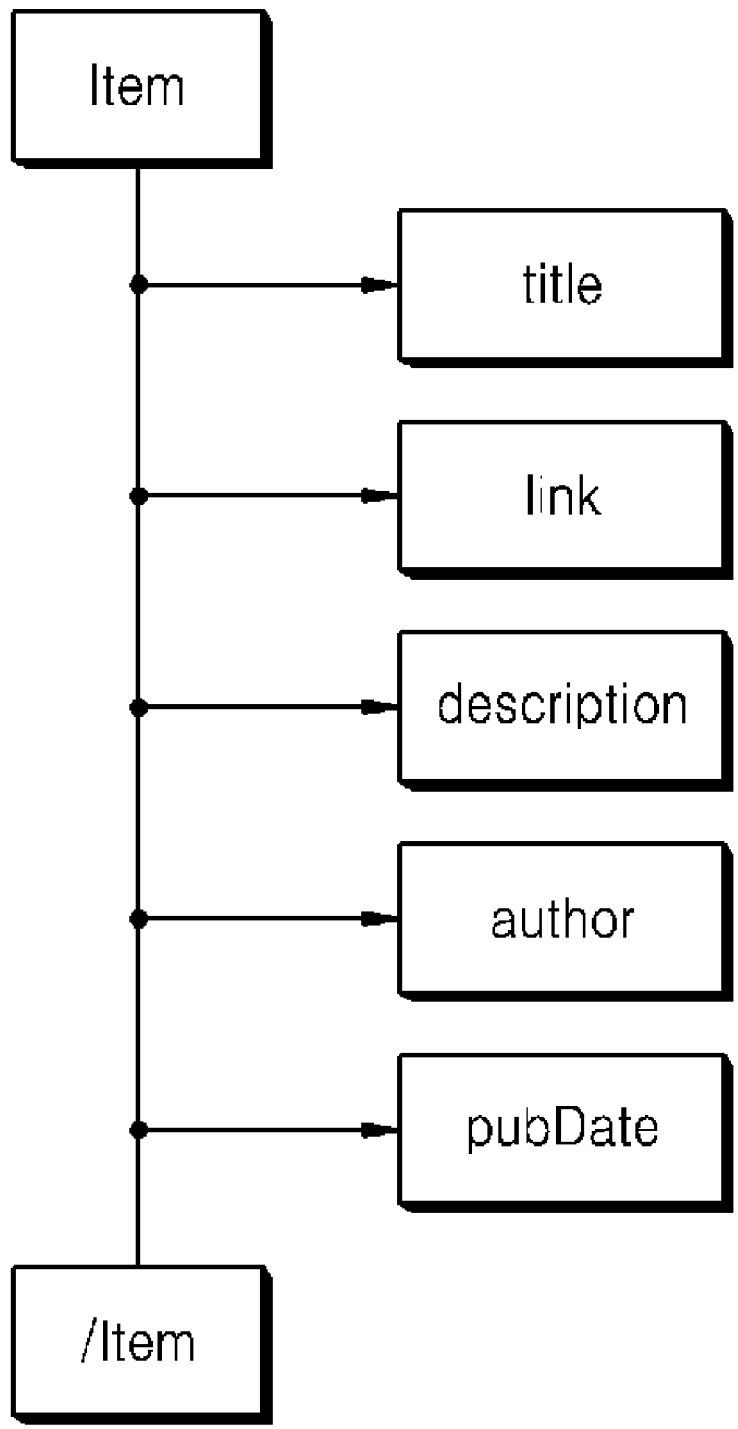
FIG. 1B shows the configuration of tags used with respect to one piece of uploaded data in an RSS feed.

As described above with reference to FIGS. 1A and 1B, it is not enough to represent properties of multimedia contents that are renewed in a portable device only with elements such as <title>, <link>, etc., used in order to represent information of uploaded data in a related art RSS feed. Accordingly, the device RSS feed according to an exemplary embodiment of the present invention includes various metadata of contents such as <contenttype>, <file>, <resolution>, <GPS>, etc.

Here, the <contenttype> represents the type of the contents (that is, a movie type or an image type), the <file> represents the file name, the <resolution> represents the resolution, and the <GPS> represents GPS coordinates for places where the contents are generated. Also, it is obvious to one of ordinary skill in the art that various metadata for the contents generated by the portable device can be included in the device RSS feed.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the present invention, even if a user of a portable device does not browse all contents of the portable device, the user can easily see only information about contents, which are recently updated, in another device such as a PC that is often used by the user.

What is claimed is:

1. A method for a portable device to communicate with at least one other device, the method comprising:
   if contents of the portable device are renewed, generating, by the portable device, a rich site summary (RSS) feed for the renewed contents; and
   sending the RSS feed to an RSS reader of the at least one other device.

2. The method of claim 1, wherein the RSS feed comprises at least one of the following pieces of information: information about a model name, an IP address, a maker of the portable device, and metadata of the contents that are generated by the renewal.

3. The method of claim 1, further comprising:
   certifying whether the RSS reader has authority to receive an RSS feed of the portable device,
   wherein in the sending of the RSS feed, the RSS feed is sent to the RSS reader only when the RSS reader has authority to receive an RSS feed of the portable device.

4. The method of claim 1, wherein the contents comprise at least one of the following file types: an image file, a movie file, and an audio file.

5. A portable device, comprising:
   an RSS feed generating unit which generates an RSS feed for renewed contents in the portable device; and
   a communication unit which sends the RSS feed to an RSS reader of a second device.

6. The portable device of claim 5, wherein the RSS feed comprises at least one of the following pieces of information: information about a model name, an IP address, a maker of the portable device, and metadata of the contents that are generated by the renewal.

7. The portable device of claim 5, further comprising:
   a certification unit for certifying whether the RSS reader has authority to receive an RSS feed of the portable device or,
   wherein the communication unit sends the RSS feed to the RSS reader only when the RSS reader has authority to receive an RSS feed of the portable device.

8. The portable device of claim 5, wherein the contents comprise at least one of the following file types: an image file, a movie file, and an audio file.

9. A non-transitory computer readable recording medium having embodied thereon a computer program for executing a method for a portable device to communicate with at least one other device, the method comprising:
   if contents of the portable device are renewed, generating, by the portable device, a rich site summary (RSS) feed for the renewed contents; and
   sending the RSS feed to an RSS reader of the at least one other device.

* * * * *